United States Patent
Subramaniam et al.

(10) Patent No.: US 10,727,977 B2
(45) Date of Patent: Jul. 28, 2020

(54) SYSTEM AND METHOD FOR IMPROVING FORWARD ERROR CORRECTION EFFICIENCY

(71) Applicant: Hughes Network Systems LLC, Germantown, MD (US)

(72) Inventors: Bala Subramaniam, Potomac, MD (US); Yanlai Liu, Rockville, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 33 days.

(21) Appl. No.: 15/856,650

(22) Filed: Dec. 28, 2017

(65) Prior Publication Data

US 2018/0191463 A1    Jul. 5, 2018

Related U.S. Application Data

(60) Provisional application No. 62/440,628, filed on Dec. 30, 2016.

(51) Int. Cl.
| | |
|---|---|
| *H04L 1/00* | (2006.01) |
| *H04W 28/04* | (2009.01) |
| *H04W 28/06* | (2009.01) |

(52) U.S. Cl.
CPC .......... *H04L 1/0043* (2013.01); *H04L 1/0051* (2013.01); *H04W 28/04* (2013.01); *H04W 28/06* (2013.01)

(58) Field of Classification Search
CPC ..... H04L 1/0043; H04L 1/0051; H04L 29/02; H03M 13/1128; H03M 13/2951; H03M 13/2975; H03M 13/3753; H04W 28/04; H04W 28/06

USPC .................................................. 714/752, 776
See application file for complete search history.

(56) References Cited

U.S. PATENT DOCUMENTS

| | | | |
|---|---|---|---|
| 2007/0038921 A1 | 2/2007 | Pekonen et al. | |
| 2009/0193318 A1 | 7/2009 | Schoenblum | |
| 2009/0307727 A1* | 12/2009 | Thesling ................ | H04H 20/74 725/63 |

(Continued)

OTHER PUBLICATIONS

International Search Report and Written Opinion dated Mar. 19, 2018 in corresponding International Application No. PCT/US17/68858, filed Dec. 29, 2017.

(Continued)

*Primary Examiner* — Albert Decady
*Assistant Examiner* — Osman M Alshack
(74) *Attorney, Agent, or Firm* — Global IP Counselors, LLP

(57) ABSTRACT

A system and method for improving forward error correction efficiency in a communication network. The system and method employ a controller configured to evaluate a plurality of frames to identify a first type of the plurality of frames having a first frame processing characteristic pertaining to a first type of frame iteration processing performed by a terminal of the communication network and a second type of the plurality of frames having a second frame processing characteristic pertaining to a second type of frame iteration processing performed by the terminal. The controller is further configured to arrange a plurality of the first type of frames and at least one of the plurality of the second type of frames in an alternating order within a transmission window for transmission to the terminal.

14 Claims, 8 Drawing Sheets

(56) References Cited

U.S. PATENT DOCUMENTS

| | | | |
|---|---|---|---|
| 2010/0002692 A1* | 1/2010 | Bims | H04L 1/0009 370/389 |
| 2010/0159861 A1* | 6/2010 | Becker | H04L 7/0029 455/205 |
| 2010/0234071 A1* | 9/2010 | Shabtay | H04B 7/0408 455/562.1 |
| 2010/0260043 A1* | 10/2010 | Kimmich | H04L 1/0003 370/229 |
| 2010/0260045 A1* | 10/2010 | Kimmich | H04L 1/0003 370/230 |
| 2010/0260259 A1* | 10/2010 | Kimmich | H04L 1/0003 375/240.07 |
| 2013/0157560 A1* | 6/2013 | Blau | H04B 7/18543 455/10 |
| 2013/0223320 A1* | 8/2013 | Becker | H04B 7/18582 370/312 |
| 2013/0265956 A1 | 10/2013 | Mourad et al. | |
| 2014/0226682 A1* | 8/2014 | Becker | H04B 7/18523 370/474 |
| 2014/0229800 A1* | 8/2014 | Eroz | H03M 13/13 714/776 |
| 2014/0341118 A1* | 11/2014 | Lee | H04L 45/74 370/329 |
| 2015/0256376 A1 | 9/2015 | Limberg | |
| 2016/0080802 A1* | 3/2016 | Subramaniam | H04H 40/90 725/68 |
| 2016/0173233 A1 | 6/2016 | Loghin et al. | |

OTHER PUBLICATIONS

International Preliminary Report on Patentability dated Jul. 2, 2019 in corresponding International Patent Application No. PCT/US2017/068858, filed Dec. 29, 2017.

\* cited by examiner

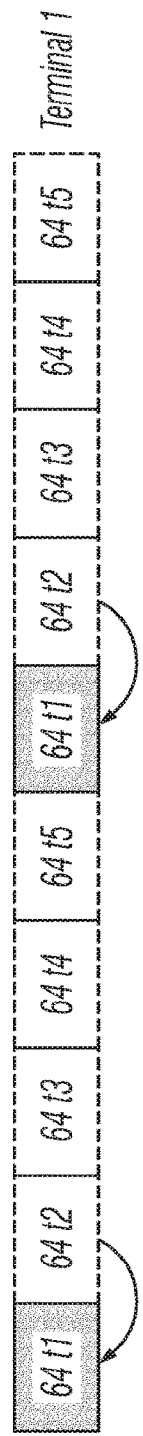
FIG. 14
FIG. 15
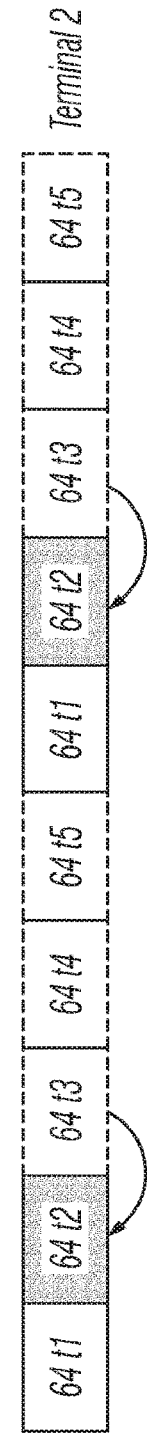
FIG. 16
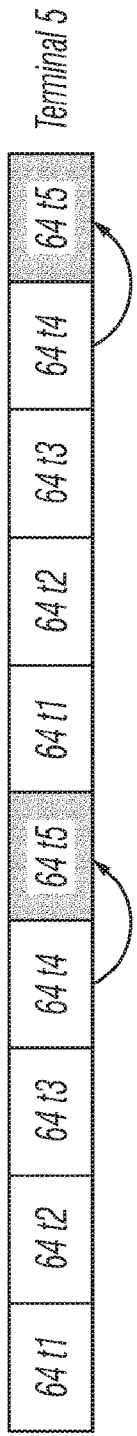
FIG. 17

SYSTEM AND METHOD FOR IMPROVING FORWARD ERROR CORRECTION EFFICIENCY

CROSS-REFERENCE TO RELATED APPLICATION

This application claims priority to U.S. Provisional Application No. 62/440,628, filed Dec. 30, 2016, the contents of which are hereby incorporated herein by reference.

BACKGROUND

Field of the Invention

The present invention generally relates to system and method for improving forward error correction efficiency. More particularly, the present invention relates to a system and method that arranges frames having different modulation and coding prior to their transmission in a transmission stream to enable efficient forward error correction of the frames at the receiver.

Background Information

Satellite communication networks use digital broadcast standards, such as the Digital Video Broadcasting-Satellite-Second Generation (DVB-S2) standard, to transmit media content to end users, such as consumers in their homes. The media content is received by an antenna, such as a satellite dish, and output to a receiver, such as a set-top box. Typically, the receiver processes the received signals and outputs the media content to multimedia device, such as a television.

Naturally, consumers want to view media content in real time without distortion. Therefore, consumers can become frustrated waiting for media content to buffer, or viewing content where the video and audio are not synchronized. Therefore, as understood in the art, digital broadcast standards use techniques like Forward Error Correction (FEC) to reduce such issues, especially those caused by a weak satellite signal.

Typically, the DVB-S2 standard on the forward link (i.e., the link from the satellite to the antenna) uses Low Density Parity Codes (LDPC) for FEC. However, some high-throughput satellites (HTS) are capable of supporting wideband channels that require FEC device to operate at high throughput of, for example, 1 Gbps or greater. Therefore, FEC devices that are incapable of operating at such high throughput can be insufficient in resolving the above problems with media content delivery.

SUMMARY

One solution for increasing the throughput of an FEC device is to increase the complexity of the FEC device subsystem by adding more processing engines. Another solution is to increase the operating clock speed of the FEC device subsystems. However, adding more processing engines increases the die area and device cost, and clock speed increase is limited by timing margins and power consumption.

In order to address the issues discussed above, disclosed embodiments provide a system and method for improving forward error correction efficiency. The system and method employ a controller configured to evaluate a plurality of frames to identify a first type of the plurality of frames having a first frame processing characteristic pertaining to a first type of frame iteration processing performed by a terminal of a communication network and a second type of the plurality of frames having a second frame processing characteristic pertaining to a second type of frame iteration processing performed by the terminal. The controller is further configured to arrange a plurality of the first type of frames and at least one of the plurality of the second type of frames in an alternating order within a transmission window for transmission to the terminal.

BRIEF DESCRIPTION OF THE DRAWINGS

Referring now to the attached drawings which form a part of this original disclosure:

FIGS. 14 through 17 are conceptual diagrams illustrating backward and forward borrowing and borrowing from gap due to frame dropping by a terminal from frames addressed to different terminals as performed on a window of frames as arranged by a controller in the system for improving forward error correction efficiency according to a disclosed embodiment.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

As will now be described, disclosed embodiments provide a system and method improving forward error correction efficiency in a communication network. The system and method can be employed in any suitable device, such as a gateway in a satellite communication network.

Figure 1:
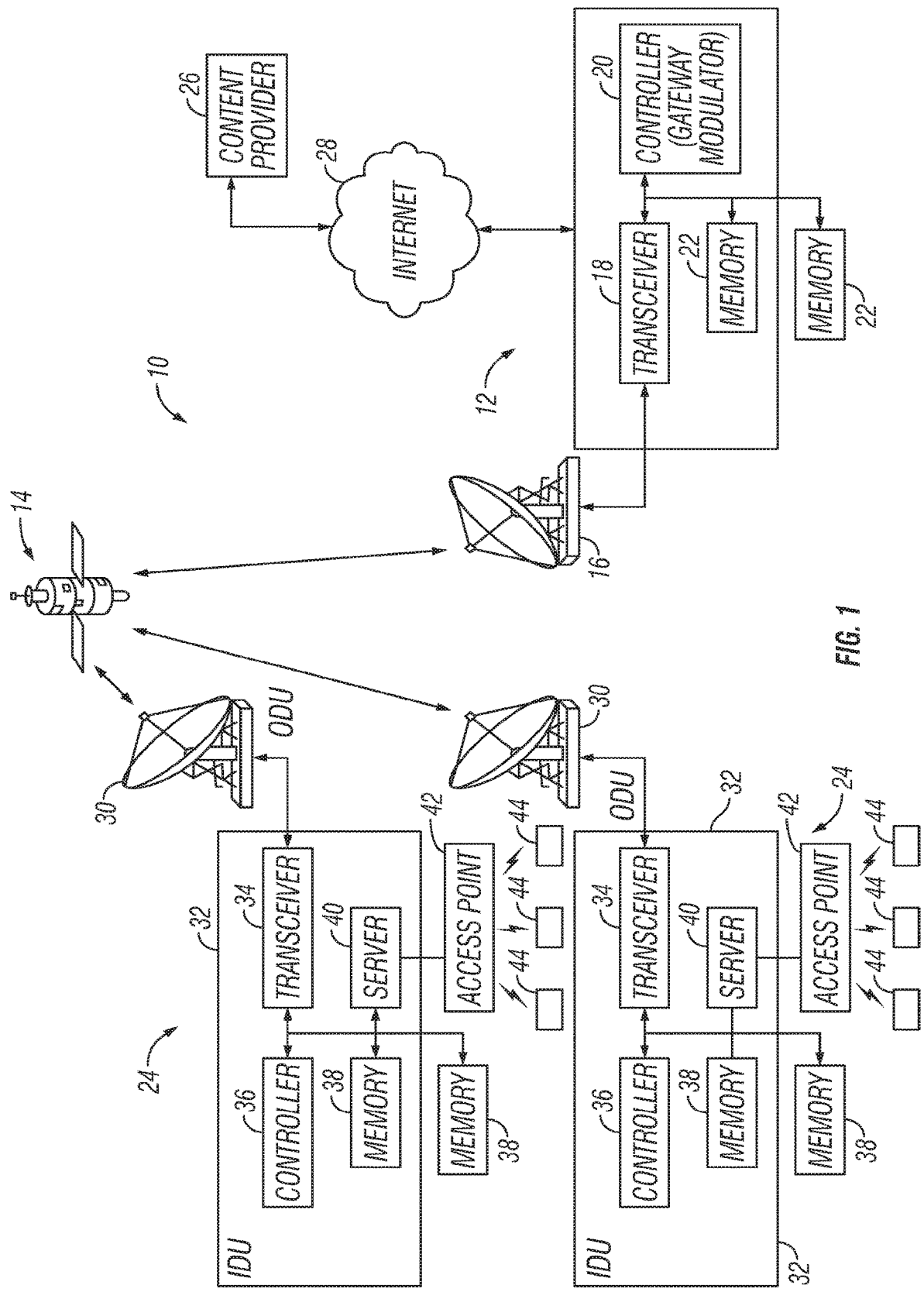
FIG. 1 illustrates an example of a satellite communication network in which a system for improving forward error correction efficiency according to a disclosed embodiment is employed.

FIG. 1 illustrates an example of a satellite communication network 10 employing a system for improving forward error correction efficiency according to an exemplary embodiment. A satellite communication network 10 typically includes a plurality of terrestrially mounted gateways 12 that communicate with one or more orbiting satellites 14. Each satellite gateway includes an antenna dish 16, a transceiver 18, a controller 20, a memory 22 and other types of equipment (not shown) such as amplifiers, waveguides and so on as understood in the art on which enable communication between the gateway 12 and a plurality of satellite user terminals 24 via one or more of the orbiting satellites 14. The memory 22 can be, for example, an internal memory in the gateway 12, or other type of memory devices such as flash memory or hard drives with external high speed interface such as a USB bus or an SATA bus, or remote memories such as cloud storage and so on. These other types of memory can be present at the gateway 12 or accessible at a location apart from the gateway 12 via a network connection such as an Ethernet connection, a WiFi connection or any other suitable type of connection as understood in the art.

As understood in the art, the controller 20 preferably includes a microcomputer with a control program that controls the gateway 12 as discussed herein. The controller 20 can also include other conventional components such as an input interface circuit, an output interface circuit, and storage devices such as a ROM (Read Only Memory) device and a RAM (Random Access Memory) device. The RAM and ROM store processing results and control programs that are run by the controller 20. For purposes of the description herein, the controller 20 can perform operations associated with a gateway modulator, or the gateway modulator can be configured as a separate device or devices. The controller 20 can also perform the operations for performing stream forming and frame arrangement to allow higher possibility of iteration borrowing at terminals using the methods as described herein with regard to FIGS. 2 through 17. The controller 20 is operatively coupled to the components of the gateway 12 as appropriate, in a conventional manner. It will be apparent to those skilled in the art from this disclosure that the precise structure and algorithms for the controller 20 can be any combination of hardware and software that will carry out the functions of the present invention.

The gateway 12, satellites 14 and satellite user terminals 24 typically communicate with each other over a radio frequency link, such as a Ku-band link, a Ka-band link or any other suitable type of link as understood in the art. Also, one or more of the gateways 12 can be configured as a network management center or network operating center which, among other things, operate to communicate with remote sites, such as web content providers 26, via the Internet 28, cloud storage, or other communication networks as understood in the art. In addition, the gateways 12 can communicate with each other via, for example, the Internet 28 or other communication networks.

As further shown in FIG. 1, a satellite user terminal 24 typically includes an antenna dish 30 that is commonly referred to as an outdoor unit (ODU), and a device such as a set-top box or other type of equipment that is commonly referred to as an indoor unit (IDU) 32. The IDU 32 typically includes a transceiver 34, a controller 36, a memory 38, a local server 40 and other types of equipment (not shown) such as amplifiers, waveguides and so on as understood in the art on which enable communication between the satellite user terminal 24 and one or more gateways 12 via one or more of the orbiting satellites 14. A transceiver 34 can include, for example, an integrated satellite modem and any other suitable equipment which enables the transceiver 34 to communicate with one or more of the orbiting satellites 14 as understood in the art. The memory 38 can be, for example, an internal memory in the satellite user terminal 24, or other type of memory devices such as a flash memory or hard drives with external high speed interface such as a USB bus or an SATA bus, or remote memories such as cloud storage and so on. These other types of memory can be present at the satellite user terminal 24 or accessible at a location apart from the satellite user terminal 24 via a network connection such as an Ethernet connection, a WiFi connection or any other suitable type of connection as understood in the art.

As with the controller 20 for a gateway 12, the controller 36 preferably includes a microcomputer with a control program that controls the satellite user terminal 24 as discussed herein. The controller 36 can also include other conventional components such as an input interface circuit, an output interface circuit, and storage devices such as a ROM (Read Only Memory) device and a RAM (Random Access Memory) device. The RAM and ROM store processing results and control programs that are run by the controller 36. The controller 36 is operatively coupled to the components of the satellite user terminal 24 as appropriate, in a conventional manner. In addition, the controller 36 can perform FEC operations, or the FEC can be configured as a separate device or devices, as understood in the art. It will be apparent to those skilled in the art from this disclosure that the precise structure and algorithms for the controller 36 can be any combination of hardware and software that will carry out the functions of the present invention.

The memory 38 can be, for example, an internal memory in the terminal 24, or other type of memory devices such as a flash memory or hard drives with external high speed interface such as a USB bus or an SATA bus, or remote memories such as cloud storage and so on. These other types of memory can be present at the terminal 24 or accessible at a location apart from the terminal 24 via a network connection such as an Ethernet connection, a WiFi connection or any other suitable type of connection as understood in the art. Also, the local server 40 can communicate with an access point 42, such as a WAP or any other suitable device, which enables the local server 40 to provide packets to end user devices 44 as discussed herein. Such end user devices 44 include, for example, desktop computers, laptop or notebook computers, tablets (e.g., iPads), smart phones, Smart TVs and any other suitable devices as understood in the art. Naturally, the communications between the local server 38, the access point 42 and the end user devices 44 can occur over wireless connections, such as WiFi connections, as well as wired connections as understood in the art.

In a satellite communication network 10 described herein, it is desirable to increase the throughput of FEC processing to improve media content delivery as discussed in the Background section above. U.S. Patent Publication No. 2016/0080802 of the current applicant describes techniques for increasing FEC throughput with the use of early termination and iteration borrowing as discussed below. In a satellite communication network 10, several terminals 24 typically share a single outroute stream of DVB-S2 frames with different modulation and coding. The operations discussed with regard to a terminal 24 can performed by all terminals 24.

A terminal 24 (e.g., the controller 36 of the terminal 24) measures the outroute signal-to-noise ratio (SNR) and communicates that information via a satellite link back to the gateway modulator which, as discussed above, can be included in the controller 20 at the gateway 12. The SNR at the terminal 24 depends on the channel conditions such as a clear sky, the presence of clouds or rain, and so on. The gateway modulator transmits a frame with a MODCOD (modulation and coding) that meet the SNR threshold of the terminal 24. The terminal 24 demodulates and decodes all of the frames that the terminal 24 receives in the outroute stream, and the terminal 24 discards the packets that are not intended for that terminal 24 by, for example, performing filtering on the media access control (MAC) address. Each terminal 24 demodulates and decodes all the frames on outroute stream, and discards the packets that are not intended for that terminal 24 by performing filtering on the MAC address in each frame. Also, a terminal 24 will decode frames with MODCODs that are below, at and above the threshold SNR of the terminal 24. The FEC processing will early terminate on frames with MODCODs whose SNR requirement fall below the threshold SNR of the terminal 24. Furthermore, the FEC processing of the frame terminates before executing the predetermined number of processing iterations if the at least one of the following conditions is detected: information bits and parity bits change relative to a previous iteration of the frame; and each bit node in the frame passes an even parity check.

Thus, the FEC processing time gained from the early termination can be allocated to frames with MODCODs that are at and above the terminal threshold SNR. The frames with MODCODs at the terminal SNR threshold would require more iterations, and the additional processing time, gained from early termination, could be allocated and improve FEC frame error rate performance. This technique of using the processing time gained from early termination for use on frames that require additional iterations is referred to for purposes of the description herein as backward borrowing of "iteration borrowing." The iteration borrowing can also be gained from forward borrowing from the following frame and forward borrowing from the following gap.

As will now be described, disclosed embodiments can further improve the iteration borrowing performance of the FEC at the terminal 24 by streamlining the modulator transmission of frame MODCODs at the gateway 12. For purposes of this description, the controller 20 at the gateway 12 performs the operations of the gateway modulator. Thus, for purposes of the following description, the controller 20 is referred to as the gateway modulator 20. Also, the features described herein can be implemented, for example, in the gateway DVB-S2 modulator of the Jupiter2 Network by Hughes Network Systems, LLC. These features enable the FEC processing for service oriented communications (SoC) received by the terminals 24 to meet performance at high throughput of greater than 1 Gbps while running at practical clock speeds. The features therefore avoid having to slow FEC processing to speeds much lower than 1 Gbps.

Figure 2:
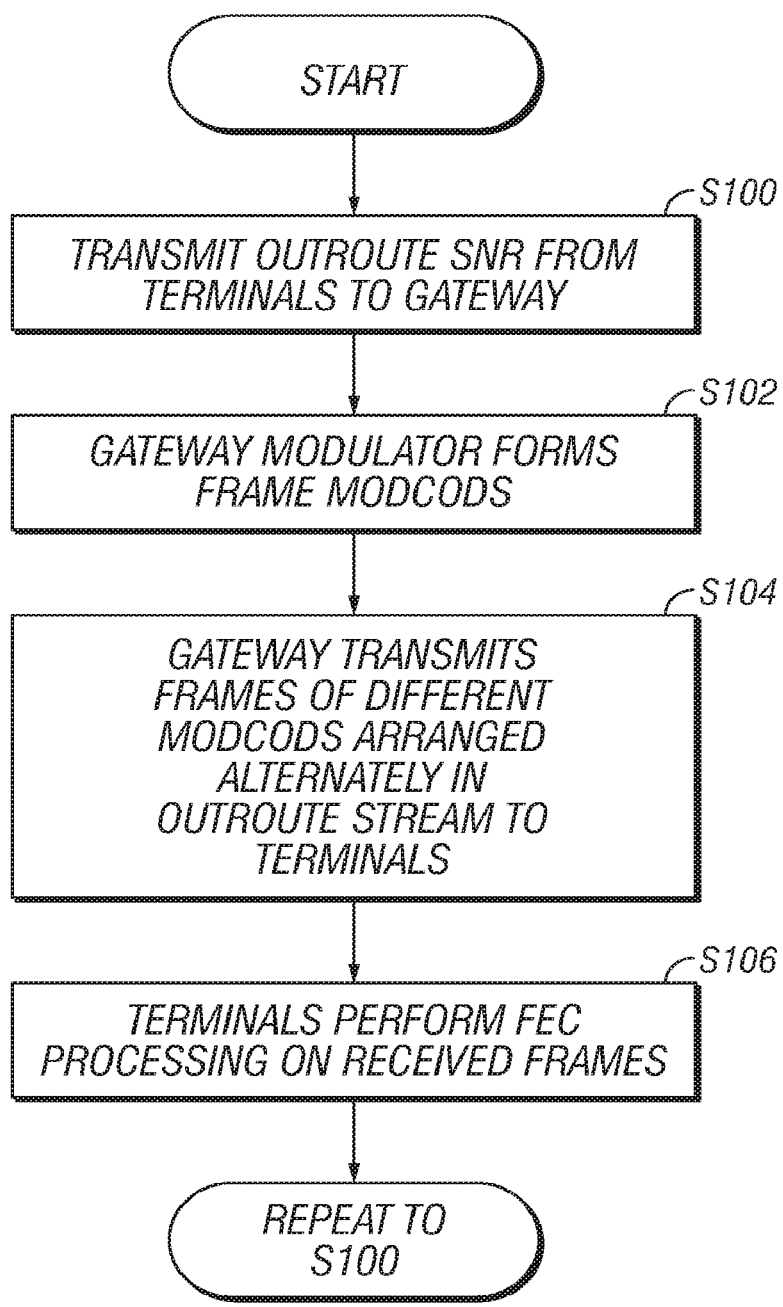
FIG. 2 is a flowchart illustrating exemplary operations performed by the system for improving forward error correction efficiency in the satellite communication network shown in FIG. 1.

An example of operations performed will be described with reference to the flowchart in FIG. 2. In step S100, each terminal 24 that is capable of communicating with the gateway 12 measures the outroute SNR and transmits information about the outroute SNR to the gateway 12 over a satellite link via the satellite 14. As understood in the art, a DVB-S2 single outroute stream is shared by several terminals 24 and comprises of frames with different modulation and coding (MODCODs). Thus, the gateway modulator 20 controls the transceiver 18 to transmit an outroute stream having frames with MODCODs that meet the SNR threshold of each terminal 24 that receives the outroute stream.

In step S102, the gateway modulator forms the frame MODCODs depending on the SNR of the terminal 24 to which the data in the frame is targeted. The manner in which the gateway modulator 20 selects the frame MODCODs does not depend on the history of the MODCODs that were sent in earlier frames. Moreover, since the gateway modulator 20 is aware of which frame goes to which terminal 24, the gateway modulator 20 can schedule continuous frames with different MODCODs having different SNR requirement (Es/No) based on, for example, Table 1 below, to achieve optimal backward and forward borrowing. As understood in the art, when a frame MODCOD is above the SNR threshold of a terminal 24, the terminal 24 drops the frame before sends the stream into the FEC. The scattered MODCOD frames in a stream results optimal borrowing time from the gap due to such frame dropping.

TABLE 1

| Modulation | Code Rates | Es/No |
|---|---|---|
| QPSK | 1/4 | 1.40 |
| QPSK | 5/6 | 3.21 |
| 8PSK | 2/3 | 6.68 |
| 8PSK | 25/36 | 6.28 |
| 16APSK | 26/45 | 8.54 |
| 16APSK | 25/36 | 8.54 |
| 32APSK | 7/9 | 10.34 |
| 32APSK | 4/5 | 10.96 |
| 64APSK | 5/6 | 11.98 |
| 64APSK | 31/36 | 12.69 |

In step S104, the gateway modulator 20 controls the transceiver 18 to transmit the frames such that the frames for all of the terminals 24 are multiplexed into a single outroute stream. According to a disclosed embodiment, the gateway modulator 20 arranges the frames in the outroute stream to enable each of the terminals 24 to perform iteration borrowing to improve the performance of the FEC at the terminals 24. For example, the gateway modulator 20 continuously monitors the frame MODCODs arriving over a window of configurable number of frames, and uses algorithms to rearrange the transmitted frame MODCOD sequence. The gateway modulator sequence algorithm can be based on streamlining the frame MODCODs so that a frame having a robust MODCOD is alternated with a frame having a MODCOD that requires higher SNR. The sequence algorithm of the gateway modulator 20 can also be based on the selection of an appropriate robust MODCOD so that an optimized benefit is achieved for the frames whose MODCOD requires higher SNR. This helps to ensure that the terminal FEC iteration borrowing is optimal, such that a frame having a robust MODCOD will early terminate and a frame having a MODCOD that has higher SNR requirement will benefit from iteration borrowing.

In one example, the gateway modulator 20 monitor the MODCODs over a programmable period (e.g., window) of, for instance, 10 frames. However, the gateway modulator 20 can monitor the MODCODs over any suitable period having any practical number of frames. Thus, during step S104, the gateway modulator 20 rearranges the frame MODCODs for the 10 frames as alternating 8PSK and 32APSK MODCODs as shown, for example, in FIG. 3. The gateway modulator 20 can use, for example, any type of buffering or caching configuration in the gateway modulator 20, in the memory 22, or at any other suitable location to achieve this arranging of frames in the window of frames. This alternating of frames enables the FEC processing at terminals 24 to perform more efficient iteration borrowing in step S106. For example, the FEC terminates early on the 8PSK frames, and the processing time gained is used on 32APSK MODCODs for iteration borrowing, which is referred to backward borrowing as shown in FIG. 4. Therefore, in this arrangement of frames, all five of the 32APSK frames benefit from iteration borrowing, which results in improved FEC performance on the 32APSK frames. The borrowing can continue until a buffer fill level exceeds a threshold level. Moreover, all five of the 32APSK frames in this example will have similar FEC performance. Thus, although there can be slight increase in latency in the gateway modulator 20, the FEC frame error rate performance at the terminals 24 is improved considerably. The processing thus repeats for every window of frames.

Figure 3:
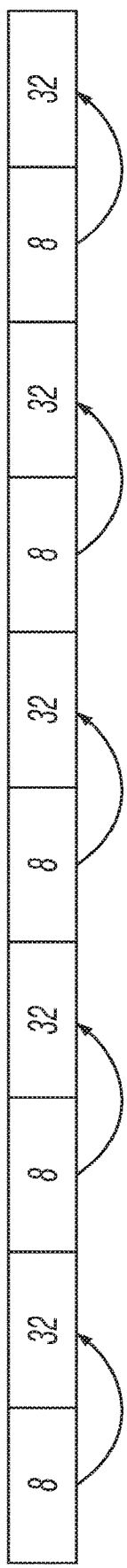
FIG. 3 is a conceptual diagram illustrating a window of frames as arranged by a controller in the system for improving forward error correction efficiency according to a disclosed embodiment.
Figure 4:
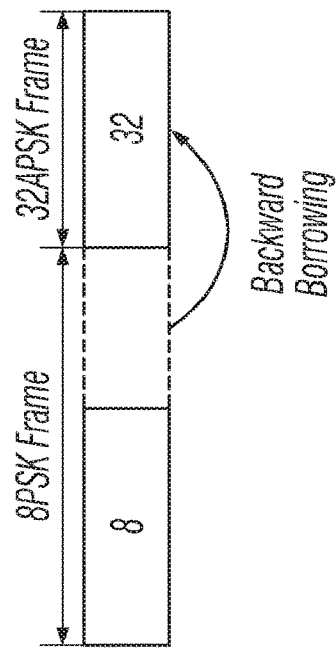
FIG. 4 is a conceptual diagram illustrating backward borrowing performed on the frames shown in FIG. 3 according to a disclosed embodiment.
Figure 5:
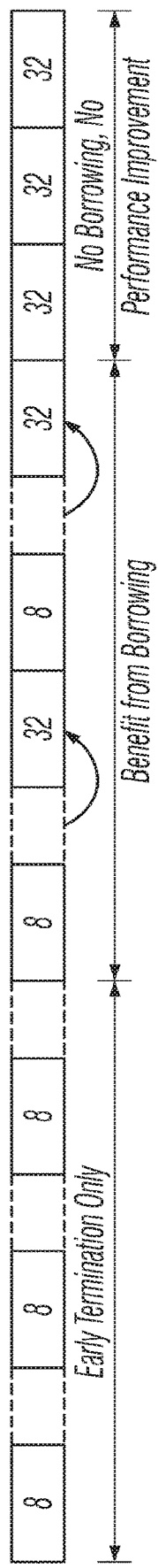
FIG. 5 is a conceptual diagram illustrating another type of arrangement of frames in a window of frames that can be performed by a controlling in the system for improving forward error correction efficiency.

This benefit in FEC frame error rate performance can be further appreciated by comparing the alternating 8PSK and 32APSK MODCODs frame arrangement as shown in FIGS. 3 and 4 with the type of frame arrangement shown in FIG. 5. In the example shown in FIG. 5, the gateway modulator 20 can instead arrange the 10 frames in a sequence with five frames of MODCODs with modulation 8PSK followed by five frames of MODCODs with modulation 32APSK. As shown, the FEC operation would early terminate on the frames with 8PSK modulation, and apply iteration borrowing on frames with 32APSK modulation. However, the 32ASPK frames in this arrangement require more iterations than allocated by frame period to meet the desired FEC performance. Therefore, in this arrangement, the first few of the 32 APSK frames would benefit from early termination of 8PSK frames, but the latter 32 ASPK frames will have time for less iteration to avoid input buffer overflow. As a result, the number of iterations allocated for the 32ASPK frames will decrease over the period of five frames of 32APSK, and the FEC performance can degrade. As discussed above, the frame arrangement shown in FIGS. 3 and 4 avoids this problem.

Figure 6:
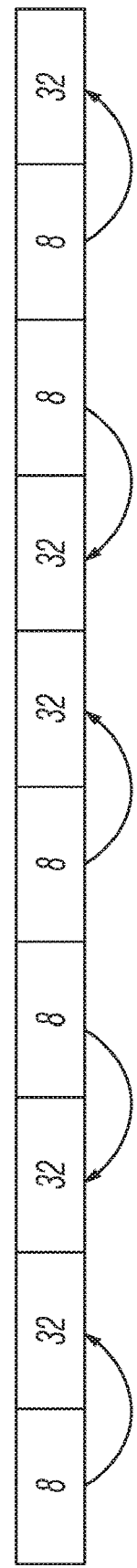
FIGS. 6 and 7 are conceptual diagrams illustrating backward and forward borrowing performed on a window of frames as arranged by a controller in the system for improving forward error correction efficiency according to a disclosed embodiment.
Figure 7:
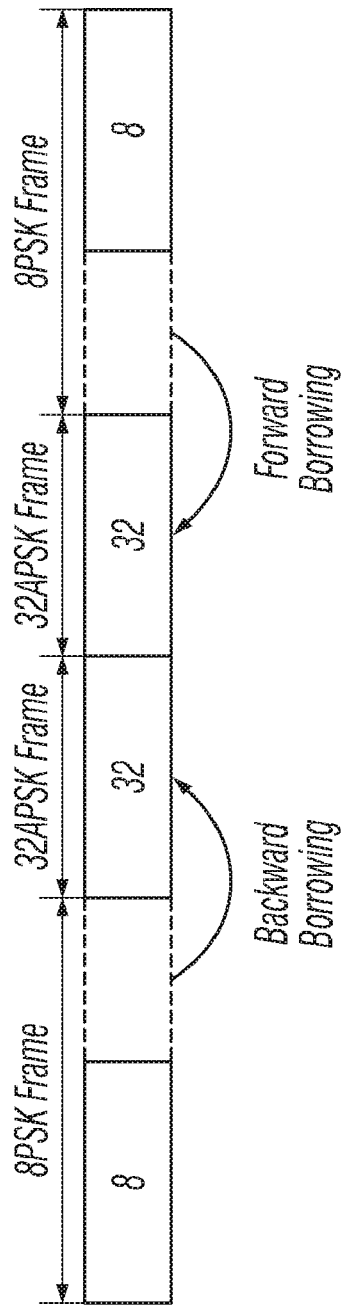

In addition, during step S104, the gateway modulator 20 can instead rearrange the frame MODCODs for the 10 frames as alternating 8PSK and 32APSK MODCODs as shown, for example, in FIGS. 6 and 7. In this arrangement, the frames are arranged in the exemplary order of 8PSK MODCOD, 32APSK MODCOD, 32APSK MODCOD, 8PSK MODCOD, 8PSK MODCOD and so on. In other words, the gateway modulator pairs a low SNR frame and a high SNR frame. This alternating pairing of frames enables the FEC processing at terminals 24 to perform backward and forward borrowing in step S106. During forward borrowing as shown in FIG. 7, the FEC processing at the terminal 24 allocates more iteration on the frame with MODCODs at and above the terminal threshold SNR. The time allocated to the frame is borrowed from the following frame with a MODCOD whose SNR is below the threshold and thus needs less iterations. Accordingly, in this example, backward borrowing is performed to obtain from the first 8PSK MODCOD frame (the first frame) more processing time to process the first 32APSK MODCOD frame (the second frame). Then, forward borrowing is performed to obtain from the second 8PSK MODCOD frame (the fourth frame) more processing time to process the second 32APSK MODCOD frame (the third frame) as so on, as indicated, for the entire window of frames.

Figure 8:
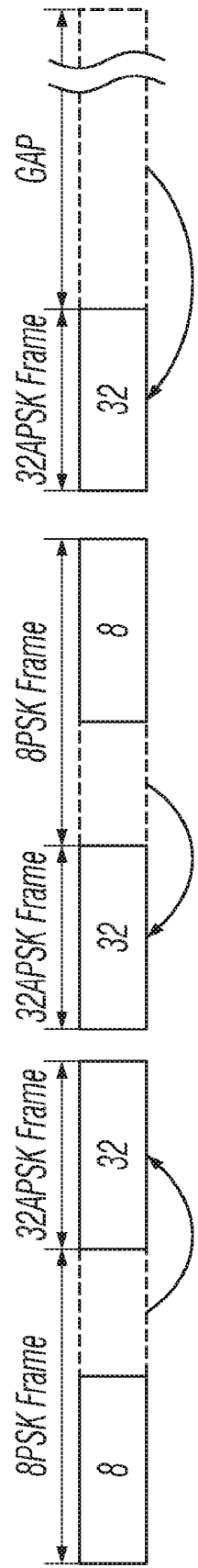
FIG. 8 is a conceptual diagram illustrating backward borrowing from previous frame, forward borrowing from following frame, and forward borrowing from gaps due to idle time or frame dropping in a window of frames as arranged by a controller in the system for improving forward error correction efficiency according to a disclosed embodiment.

Alternatively or in addition to the backward and forward iteration borrowing as described with regard to FIGS. 3, 4, 6 and 7, the FEC processing at the terminal 24 can borrow gap time as shown in FIG. 8. That is, if a gap following a frame with a MODCOD at and above the terminal threshold SNR, such as the last 32APSK MODCOD frame in the window, then the FEC processing performed at the terminal 24 can allocate the gap time to the last 32APSK MODCOD frame to perform more iterations on that last 32APSK MODCOD frame.

Figure 9:
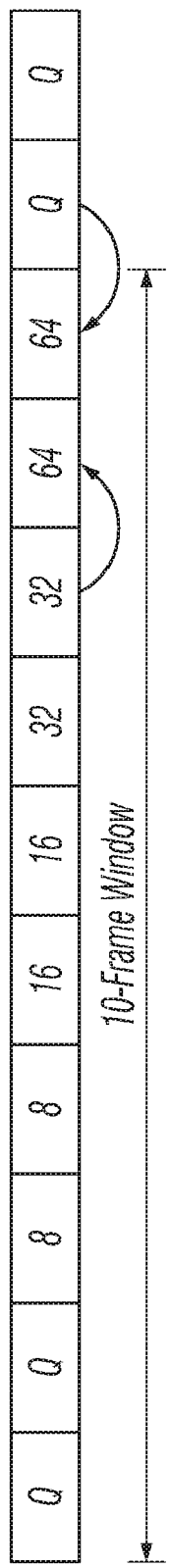
FIGS. 9 through 13 are conceptual diagrams illustrating backward and forward borrowing from the frames with less SNR threshold in a window of frames as arranged by a controller in the system for improving forward error correction efficiency according to a disclosed embodiment.
Figure 10:
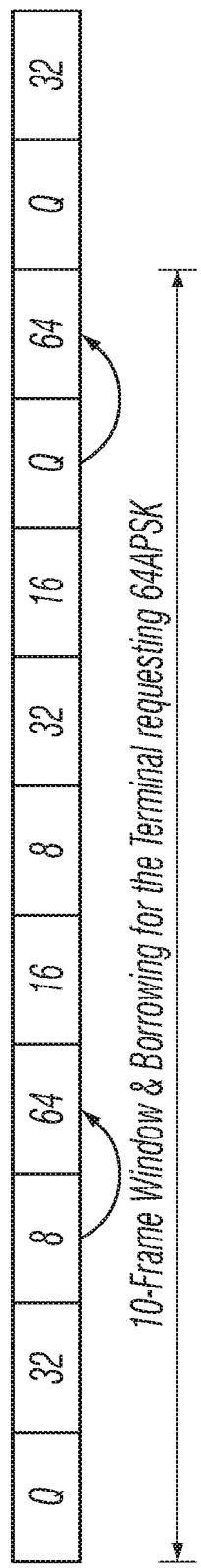
Figure 11:
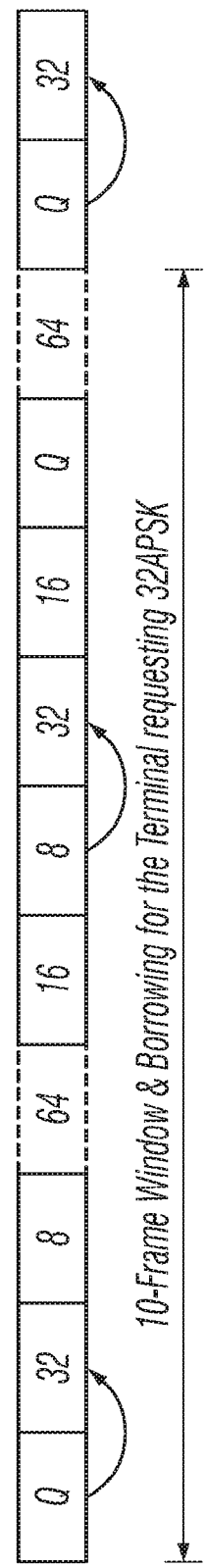
Figure 12:
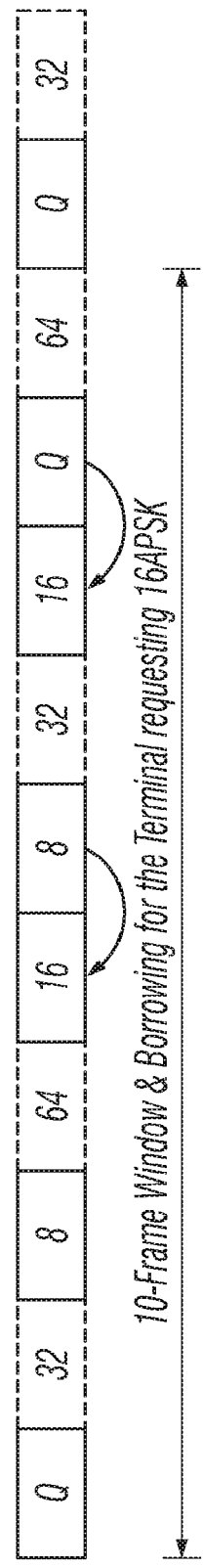
Figure 13:
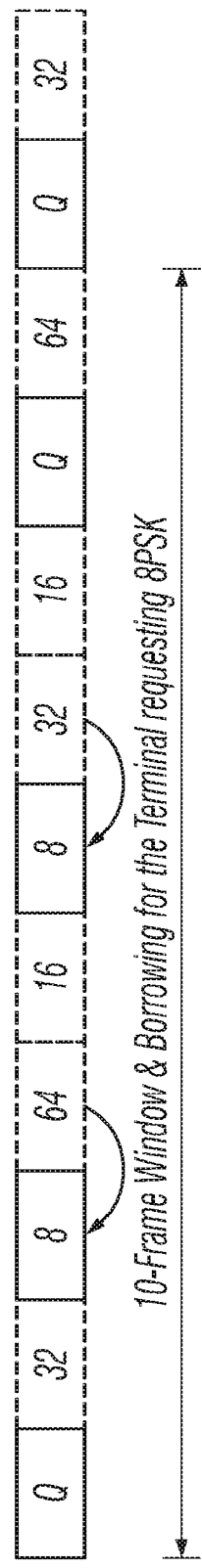

As further shown in FIGS. 9 through 13, the gateway modulator 20 can include QPSK frames (labeled "Q" in the Figures) in the frame windows, so that the terminal 24 receiving the frame windows can perform backward or forward borrowing of time from the Q frames. FIG. 9 shows an example of stream with less arrangement at the gateway modulator 20. FIG. 10 through 13 shows examples of a re-arranged stream of FIG. 9 decoded at different terminal 24 requesting different MODCOD. With the new re-arrangement in the shared stream, each terminals 24 requesting different MODCOD can achieve more iteration borrowing. For instance, as shown in FIGS. 9 and 10, a terminal 24 requesting 64APSK frames can perform backward and forward borrowing from the Q frames, while also performing backward and forward borrowing on other frames (e.g., the 8PSK frames) to obtain more iterations for the 64APSK frames. Similarly, as shown in FIG. 11, a terminal 24 requesting 32APSK frames can perform backward and forward borrowing from the Q frames, while also performing backward and forward borrowing on other frames (e.g., the 8PSK frames) to obtain more iterations for the 32APSK frames. Likewise, as shown in FIG. 12, a terminal 24 requesting 16APSK frames can perform backward and forward borrowing from the Q frames, while also performing backward and forward borrowing on other frames (e.g., the 8PSK frames) to obtain more iterations for the 16APSK frames. In FIG. 13, a terminal 24 requesting 8PSK frames drops the frames above its SNR threshold (e.g., the 16APSK, 32APSK, and 64APSK frames) before sends the stream into its FEC. It can perform backward and forward borrowing from the Q frames, while also performing borrowing on the gap due to the dropping of the 64APSK frames and 32ASPK frames to obtain more iterations for the 8PSK frames.

In addition, in a situation in which all or at least a plurality of terminals 24 receiving a stream are requesting the same type of frames (e.g., 64ASPK frames), the gateway modulator 20 can arrange the frames addressed to the different terminals 24 within the frame window to still allow for backward borrowing, forward borrowing and borrowing from gap. For example, as shown in FIGS. 14 through 17, when five terminals 24, labeled t1 through t5, assuming with increasing SNR threshold from t1 to t5, are all requesting 64ASPK frames, the gateway modulator 20 can arrange the frames addressed to the different terminals 24 an order (e.g., two frames for terminal t1, two frames for terminal t2 and so on) in the frame window which enables each terminal 24 to perform iteration borrowing from gap or frames that are not addressed to the terminal 24. Therefore, as shown in FIG. 15, terminal t1 can perform forward borrowing from the gap due to dropping of a frame addressed to terminal t2 to obtain additional time for performing FEC processing on a frame that is address to terminal t1. Likewise, as shown in FIG. 16, terminal t2 can perform forward borrowing from the gap due to dropping of a frame addressed to terminal t3 to obtain additional time for performing FEC processing on a frame that is address to terminal t2. While for terminal t5 which has the highest SNR threshold, it can perform backward borrowing from a frame addressed to terminal t4 to obtain additional time for performing FEC processing on a frame that is address to terminal t5. Naturally, all of the terminals t1 through t5 can perform forward or backward borrowing, as appropriate, to obtain the additional FEC processing times for their frames.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also, the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A system for communication in a communication network, the system comprising:
   a controller configured to evaluate a plurality of frames to identify a first type of frames with a first type of modulation and coding that is configured to be processed by a first type of frame iteration processing performed by a terminal of the communication network and a second type of frames with a second type of modulation and coding that is configured to be processed by a second type of frame iteration processing performed by the terminal of the communication network, the first type of frames requiring higher signal-to-noise ratio than the second type of frames, the first and second types of modulation and coding being different from each other;
   the controller being further configured to arrange a plurality of the first type of frames with the first type of modulation and coding and at least one of a plurality of the second type of frames with the second type of modulation and coding in an alternating order within a transmission window for transmission to the terminal of the communication network such that the first type of frame iteration processing for one of the plurality of the first type of frames benefits from iteration borrowing within the transmission window due to an early termination of the second type of frame iteration processing for an adjacent one of the plurality of the second type of frames; and
   the controller being further configured to receive information pertaining to the first type of frame iteration processing for the first type of modulation and coding and the second type of frame iteration processing for the second type of modulation and coding from the terminal of the communication network.

2. The system according to claim 1, wherein
the alternating order includes a respective one of the second type of frames between each of two sequential first type of frames within the transmission window.

3. The system according to claim 1, wherein
the controller is configured to group the first and second types of frames into a plurality of first frame pairs and a plurality of second frame pairs, each of the first frame pairs having a respective first type of frame positioned first and a respective second type of frame positioned second, and each of the second frame pairs having a respective second time of frame positioned first and a respective first type of frame positioned second; and
the alternating order includes the plurality of first frame pairs and at least one of the second frame pairs positioned alternately within the transmission window.

4. The system according to claim 1, wherein
the information includes information pertaining to a signal-to-noise ratio of a communication link from the communication network to the terminal of the communication network.

5. The system according to claim 1, further comprising
a transceiver, configured to communicate with the terminal of the communication network over the communication network; and
the controller is further configured to control the transceiver to transmit to the terminal of the communication network the transmission window including the plurality of the first type of frames and the plurality of the second type of frames in the alternating order.

6. The system according to claim 1, wherein
the communication network is a satellite communication network; and
the controller is disposed in a gateway of the satellite communication network.

7. The system according to claim 1, wherein
the controller is further configured to evaluate the plurality of frames to identify other types of frames with other type of modulation and coding that is configured to be processed by other types of frame iteration processing performed by the terminal of the communication network, and the controller is further configured to arrange the other types of frames along with the first and second types of frames within the transmission window for transmission to the terminal of the communication network.

8. A method for communication in a communication network, the method comprising:

evaluating, by a processor, a plurality of frames to identify a first type of frames with a first type of modulation and coding that is configured to be processed by a first type of frame iteration processing performed by a terminal of the communication network and a second type of frames with a second type of modulation and coding that is configured to be processed by a second type of frame iteration processing performed by the terminal of the communication network, the first type of frames requiring higher signal-to-noise ratio than the second type of frames, the first and second types of modulation and coding being different from each other;

arranging, by the processor, a plurality of the first type of frames with the first type of modulation and coding and at least one of a plurality of the second type of frames with the second type of modulation and coding in an alternating order within a transmission window for transmission to the terminal of the communication network such that the first type of frame iteration processing for one of the plurality of the first type of frames benefits from iteration borrowing within the transmission window due to an early termination of the second type of frame iteration processing for an adjacent one of the plurality of the second type of frames; and receiving at the processor information pertaining to the first type of frame iteration processing for the first type of modulation and coding and the second type of frame iteration processing for the second type of modulation and coding from the terminal of the communication network.

9. The method according to claim 8, wherein
the alternating order includes a respective one of the second type of frames between each of two sequential first type of frames within the transmission window.

10. The method according to claim 8, wherein
the arranging groups the first and second types of frames into a plurality of first frame pairs and a plurality of second frame pairs, each of the first frame pairs having a respective first type of frame positioned first and a respective second type of frame positioned second, and each of the second frame pairs having a respective second time of frame positioned first and a respective first type of frame positioned second; and
the alternating order includes the plurality of first frame pairs and at least one of the second frame pairs positioned alternately within the transmission window.

11. The method according to claim 8, wherein
the information includes information pertaining to a signal-to-noise ratio of a communication link from the communication network to the terminal of the communication network.

12. The method according to claim 8, further comprising
controlling, by the processor, a transceiver to transmit to the terminal of the communication network the transmission window including the plurality of the first type of frames and the plurality of the second type of frames in the alternating order.

13. The method according to claim 8, wherein
the communication network is a satellite communication network; and
the evaluating and arranging are performed in a gateway of the satellite communication network.

14. The method according to claim 8, wherein
the evaluating further includes evaluating the plurality of frames to identify other types of frames with other type of modulation and coding that is configured to be processed by other types of frame iteration processing performed by the terminal of the communication network; and
the arranging further includes arranging the other types of frames along with the first and second types of frames within the transmission window for transmission to the terminal of the communication network.

* * * * *